US010496394B2

(12) United States Patent
Frantz et al.

(10) Patent No.: US 10,496,394 B2
(45) Date of Patent: Dec. 3, 2019

(54) CLOUD-BASED DYNAMIC OPTIMIZATION OF VEHICLE SOFTWARE UPDATES

(71) Applicant: FORD GLOBAL TECHNOLOGIES, LLC, Dearborn, MI (US)

(72) Inventors: William Lawrence Frantz, Ferndale, MI (US); Daniel Madrid, Livonia, MI (US); Chad Esselink, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/902,760

(22) Filed: Feb. 22, 2018

(65) Prior Publication Data

US 2019/0258467 A1    Aug. 22, 2019

(51) Int. Cl.
| | |
|---|---|
| *G06F 9/44* | (2018.01) |
| *G06F 8/65* | (2018.01) |
| *G01C 21/36* | (2006.01) |
| *G01C 21/20* | (2006.01) |
| *H04L 29/08* | (2006.01) |
| *H04W 4/80* | (2018.01) |
| *H04W 4/40* | (2018.01) |

(52) U.S. Cl.
CPC ............... *G06F 8/65* (2013.01); *G01C 21/20* (2013.01); *G01C 21/3691* (2013.01); *H04L 67/12* (2013.01); *H04L 67/34* (2013.01); *H04W 4/40* (2018.02); *H04W 4/80* (2018.02)

(58) Field of Classification Search
None
See application file for complete search history.

(56) References Cited

U.S. PATENT DOCUMENTS

| | | | |
|---|---|---|---|
| 9,104,537 B1 | 8/2015 | Penilla et al. | |
| 9,715,378 B2 * | 7/2017 | Dickerson | G06F 8/65 |
| 2017/0344355 A1 * | 11/2017 | Sarkar | G06F 8/65 |
| 2018/0321047 A1 * | 11/2018 | Sagawa | G06F 8/65 |

* cited by examiner

*Primary Examiner* — Qamrun Nahar
(74) *Attorney, Agent, or Firm* — Frank Lollo; Brooks Kushman P.C.

(57) ABSTRACT

A system for a vehicle comprises a processor, programmed to responsive to receiving a manifest from a server, perform an over-the-air (OTA) software update while traveling along a route, wherein the manifest is generated remotely by the server using business rules designated by a manufacturer, predicted network connectivity speeds along the route, and estimated time to download the OTA software update.

15 Claims, 4 Drawing Sheets

CLOUD-BASED DYNAMIC OPTIMIZATION OF VEHICLE SOFTWARE UPDATES

TECHNICAL FIELD

The present disclosure is generally related to vehicle software update optimization. More specifically, the present disclosure is related to a system for optimizing vehicle over-the-air (OTA) software updates.

BACKGROUND

Modern vehicles include components operated by controllers programmed with software. From time to time, the software may require to be updated. OTA software updating has become increasingly popular for the convenience it provides. In an OTA system, vehicles are instructed to download the new software from a server. The new software is then installed to the controller.

SUMMARY

In one or more embodiments of the present disclosure, a system for a vehicle comprises a processor, programmed to responsive to receiving a manifest indicative of the download priority from a server, perform an over-the-air (OTA) software update while traveling along a route, wherein the manifest is generated remotely by the server using business rules designated by a manufacturer, predicted network connectivity speeds along the route, and estimated time to download the OTA software update.

In one or more embodiments of the present disclosure, a server comprises a processor, programmed to responsive to receiving over-the-air (OTA) software update for a vehicle, optimize an operation to perform OTA software updates on the vehicle using estimated time to download the updates, predicted network connectivity speed for the vehicle by location, and business rules designated by a manufacturer, and generate a manifest indicative of an optimal order to download the OTA software updates; and send the manifest to the vehicle.

In one or more embodiments of the present disclosure, a method for optimizing download priority for multiple updates of a vehicle comprises receiving a route planned for the vehicle; receiving traffic data along the route, predicted connectivity speed data along the route, and driving condition data along the route from a source external to the vehicle; evaluating the predicted connectivity speed data, traffic data, driving condition data, and business rule of the multiple updates; generating a manifest indicative of the download priority; and sending the manifest to the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes an optimization of vehicle software updates. More specifically, the present disclosure proposes a cloud-based system which takes into account various factors to dynamic optimize the download for OTA software update of a vehicle. These factors may include as availability of wireless network, and estimated time to perform the OTA update. Further aspects of the disclosure are discussed in detail herein.

Figure 1:
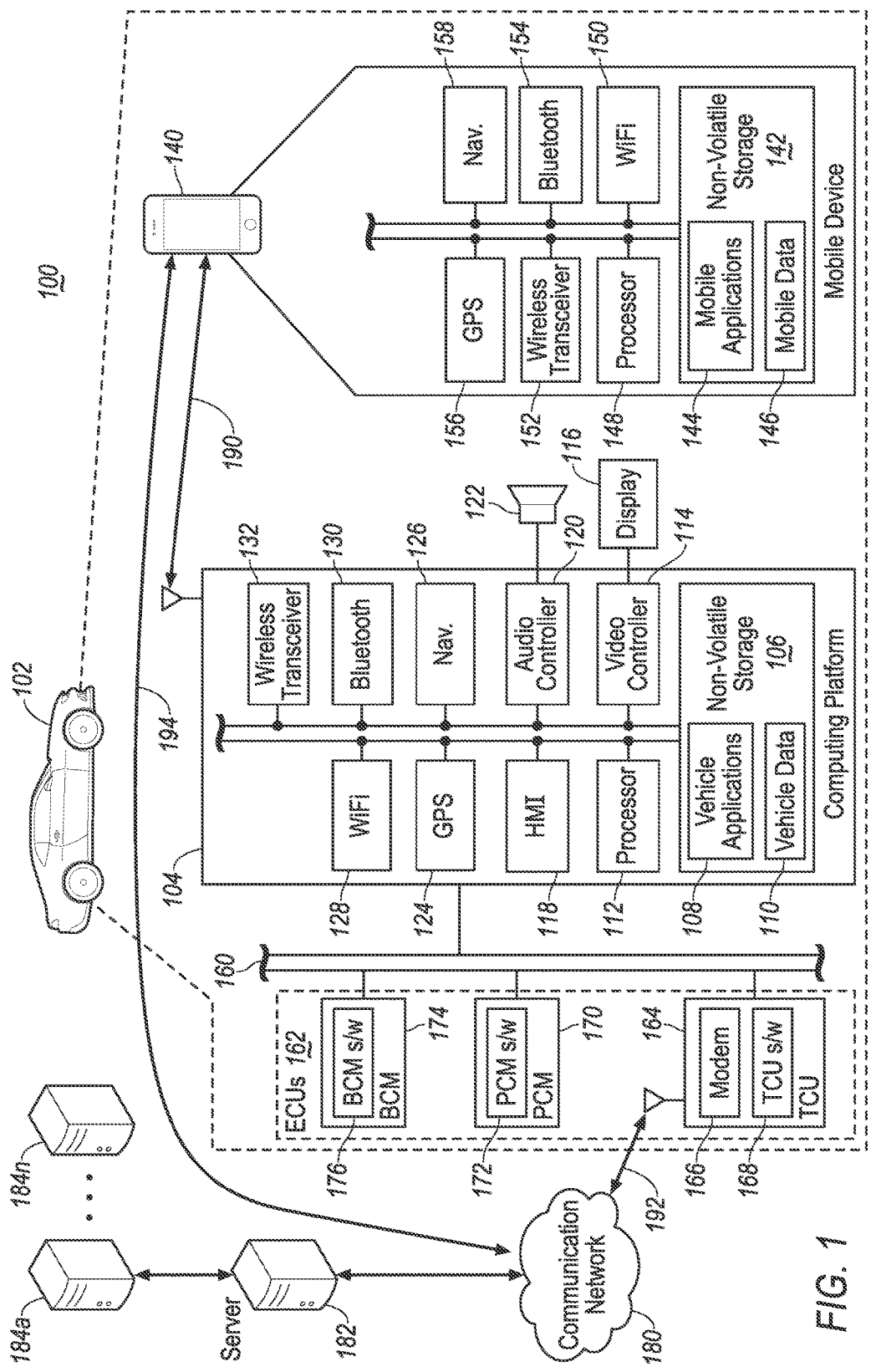
FIG. 1 illustrates an example block topology of a vehicle system of one embodiment of the present disclosure.

Referring to FIG. 1, an example block topology of a vehicle system 100 of one embodiment of the present disclosure is illustrated. Vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and software update. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning functions through a navigation controller 126 configured to calculate navigation routes responsive to user input via e.g. the HMI controls 118, and output planned routes and instructions via the speaker 122 and the display 116. Location data that is needed for navigation may be collected from a global positioning system (GPS) controller 124 configured to communicate with GPS satellites and calculate the location of the vehicle 102. Map data used for route planning may be stored in the storage 106 as a part of the vehicle data 110. Navigation software may be stored in the storage 116 as a part of the vehicle applications 108.

The computing platform 104 may be configured to communicate with a mobile device 140 of the vehicle occupants via a wireless connection 190. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 132 in communication with a WiFi controller 128, a Bluetooth controller 130, and other controllers such as a Zigbee transceiver, an IrDA transceiver, an RFID transceiver (not shown), configured to communicate with a compatible wireless transceiver 152 of the mobile device 140.

The mobile device 140 may be provided with a processor 144 configured to perform instructions, commands, and other routines in support of the processes such as navigation, calling, wireless communication, and multi-media processing. For instance, the mobile device 140 may be provided with location and navigation functions via a navigation controller 158 and a GPS controller 158 controlled by application as a part of a mobile application 144 stored in a non-volatile storage 142. Map data used for navigation purposes may be stored in the storage 142 as a part of mobile data 146. Alternatively, the mobile device 140 may be configured to download live map and traffic data from a remote server via a communication network 180 through a wireless connection 194.

The computing platform 104 may be further configured to communicate with various electronic control units (ECUs) via one or more in-vehicle network 160. The in-vehicle network 160 may include, but is not limited to, one or more of a controller area network (CAN), an Ethernet network, and a media oriented system transport (MOST), as some examples.

The vehicle 102 may include multiple ECUs 162 configured to control and operate various functions of the vehicle 102. As a few non-limiting examples, the ECUs 162 may include a body control module (BCM) 174 configured to operate various exterior and interior body functions of the vehicle 102 using BCM software 176, a powertrain control module (PCM) 170 configured to control the powertrain of the vehicle 102 using PCM software 172, and a telematics control unit (TCU) configured to control telecommunications of the vehicle 102 using TCU software 168. Each ECU may be controlled by the relevant software stored therein and the software may be updated using OTA update.

The TCU 164 may be provided with wireless communication functions via a wireless modem 164 configured to communicate with a server 182 via the communication network 180 through a wireless connection 192. It is to be noted that the server 182 illustrated in FIG. 1 is merely an example and the server 182 may be one or more servers configured to communicate and perform various functions.

The TCU 164 may be configured to enable wireless communication between various part of the vehicle 102 and the server 182 so as to perform the OTA software update including downloading the update files. As an example, the TCU 164 may be configured to upload various vehicle information to the server 182. The vehicle information may include ECU software 168, 172, 176 versions, vehicle identification number (VIN) and vehicle application 106 versions, location, planned route and etc. Additionally or alternatively, the computing platform 104 may be configured to communicate with the server 182 via the mobile device 140. The mobile device 140 may be further configured to upload location and route data from its own device in addition to the vehicle information from the computing platform 104 and ECUs 162 to the server 182 via the wireless connection 194. Responsive to receiving the data and information from the vehicle 102, the server 182 may be configured to evaluate the information and instruct the TCU 164 to download the update files in an optimized manner. The server 182 may be further configured to communicate with other sources 184 to collect more data to facilitate the optimization. As an example, other sources 184 may include one or more servers connected to the server 182 via a network.

Figure 2:
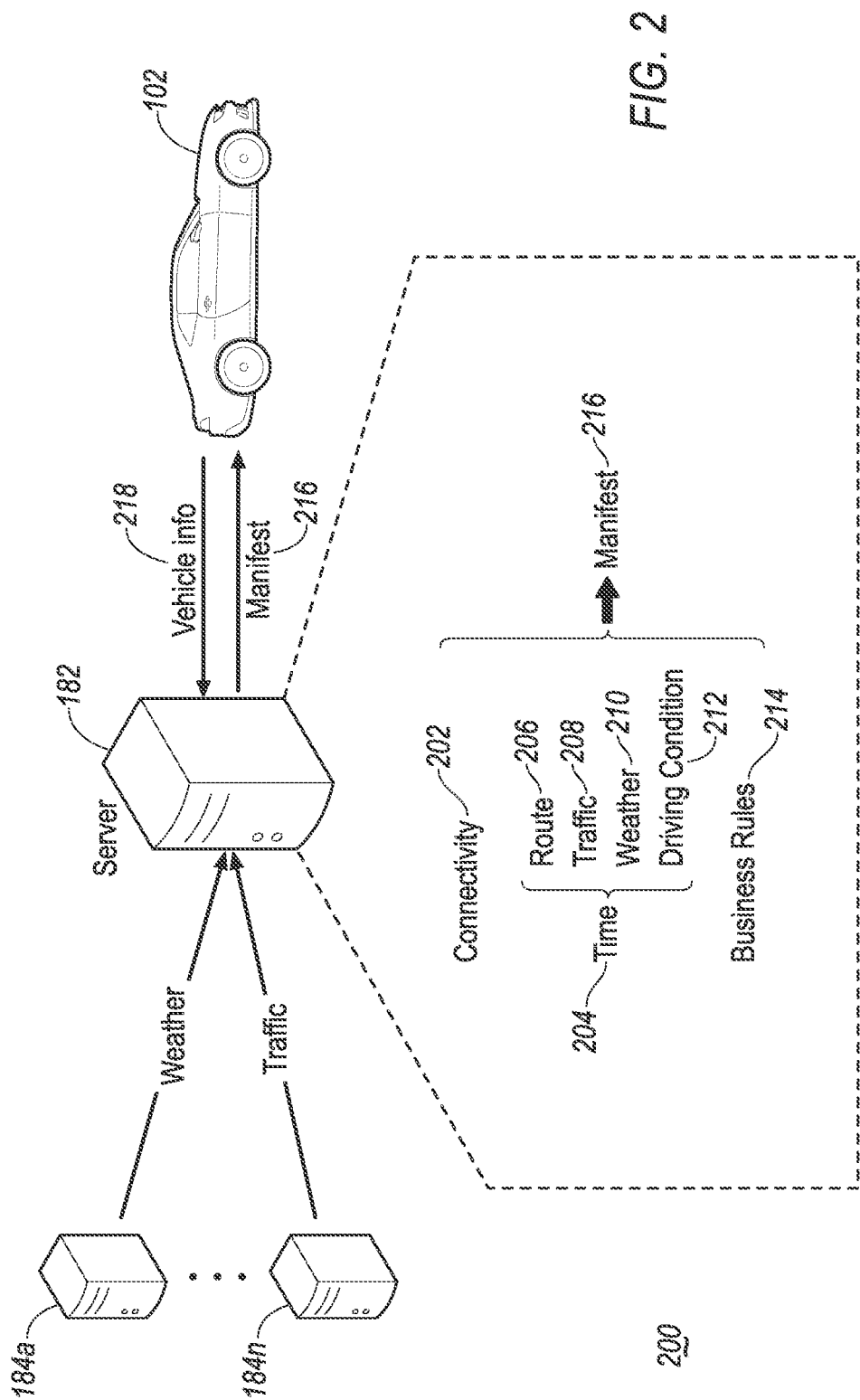
FIG. 2 illustrates an example block topology of a server system of one embodiment of the present disclosure.

Referring to FIG. 2, an example block topology of a server system 200 of one embodiment of the present disclosure is illustrated. With continued reference to FIG. 1, the server 182 may be configured to dynamically optimize the software update for the vehicle 102 using machine learning tools and real-time information 218 collected from the vehicle 102 and other sources 184. The information 218 collected from the vehicle 102 may include VIN, vehicle software/application versions, vehicle location, planned routes, and vehicle connectivity status. In addition, the server 182 may receive various information such as weather conditions, traffic conditions, available network coverage, and driving conditions from other sources 184.

To optimize the OTA software update, a plurality of factors may be considered by the server 182. As an example, those factors may include available connectivity 202, time 204 estimated to perform the update, and business rules 214. Those factors may be determined using the vehicle information 218 and data collected from other sources 184.

The available connectivity 202 may reflect any type of wireless connections available to the vehicle 102 at a particular location and time. For instance, the connectivity 202 may include information about any available WiFi connections that the vehicle 102 has access to at a particular location (e.g. user's home WiFi, or public WiFi), cellular network coverage, available vehicle-to-everything (V2X) connections. For cellular network, different network may have different coverage at different locations, and data regarding cellular network that the vehicle 102 is subscribed to may be collected from other sources 184.

The time 204 estimated to perform the update vary due to multiple factors, including route 206, traffic along a particular route 208, weather conditions 210, and driving conditions 212. As an example, the route 206 may be planned by the navigation controller 126 of the computing platform 104 or the navigation controller 158 of the mobile device 140. Alternatively, if no planned route is received, the server 182 may be configured to use a historic driving pattern of the vehicle 102 collected over time to predict a route 206 at a particular time and location. For instance, if user of vehicle 102 travels from home to work nearly every working day morning at a particular time (e.g., around 8:00 AM) via a particular route 206, it is quite likely that he/she will do the same on a future working day. Therefore, the server 182 may be configured to predict the vehicle 102 is to travel from home to work at around 8 am via the particular route 206 on the next working day and use the predicted time and route to optimize the update. Over time, the server 182 may collect location data from the computing platform 104 or the mobile device 140, with the user's permission, and therefore determine the driving pattern of the vehicle 102 through machine learning algorithms. A few nonlimiting examples of the machine learning algorithms may include Naive Bayes Classifier Algorithm; K Means Clustering Algorithm; Support Vector Machine Algorithm; Apriori Algorithm; Linear Regression; Logistic Regression; Artificial Neural Networks; Random Forests; Decision Trees; and Nearest Neighbors. Using the historic driving pattern of the vehicle 102, the server 182 may be able to predict a route 206 at a particular time and location.

After the predicted route information 206 is determined, the server 182 may be configured to determine the available network connectivity 202 on the route. Depending on the route 206, the network conditions may be dramatically different. For example, for a route 206 from a suburban location to a downtown of a metropolis, which may be a typical route for many users from home to work, the cellular network coverage at the beginning at suburban may be poor and download speed may be slow. The network conditions may gradually improve as the vehicle 102 travels toward downtown, where more network coverage and faster download speed are available.

The traffic condition 208 may reflect the real-time traffic information or predicted traffic at a particular time along the route 206 to be traversed by the vehicle 102. The traffic condition 208 may affect both the travel time and network conditions along a route 206. For instance, when traffic congestion occurs at a part of route 206, the traffic congestion increases not only travel time to the destination, but also the network congestion, reducing the network download speed for the vehicle 102.

The weather condition 210 may reflect the real-time and future weather information along the route 206 to be traversed by the vehicle 102. The weather condition 210 may affect not only the traffic condition 208, but also the availability of network connectivity 202. For instance, an upcoming storm may increase congestions on both the road and network. In addition, the storm may attenuate radio signals, which also affect network signal strength and further deteriorates the cellular network conditions.

The driving condition 212 may reflect various limitations that may affect the travelling and connectivity of the vehicle 102. A few examples for driving condition 212 may include speed limits on the route 206, road work, temporary speed limits, and local municipality connectivity policies where the route 206 passes by.

The server 182 may also use business rules 214 to optimize the update. Business rules may reflect a set of rules for updating designed by a party, such as the vehicle manufacturer. Business rules 214 may respond to factors such as criticality of an update, size of a file to be transmitted, target module for update, and marketing campaigns. For instance, updates for the ECUs, such as PCM software 172 to fix defects on the powertrain, may be defined as being more critical by the business rules 214 as compared to updates for vehicle applications 108 of the infotainment system in general. Different vehicle manufacturers may have different business rules involving more or fewer factors, and embodiments illustrated in the present disclosure are merely examples.

Evaluating the available connectivity 202, estimated time 204 for update; and business rules 214, the server 182 may determine an optimal priority/order for the vehicle 102 to download the update. The server 182 may generate a manifest 216 for the vehicle 102 to execute so as to perform the OTA software update, as optimized. As an example, a manifest 216 may be created as a file indicative of the optimal priority/order for the vehicle 102 to download the OTA software update determined by the server 182 based on available information.

Figure 3:
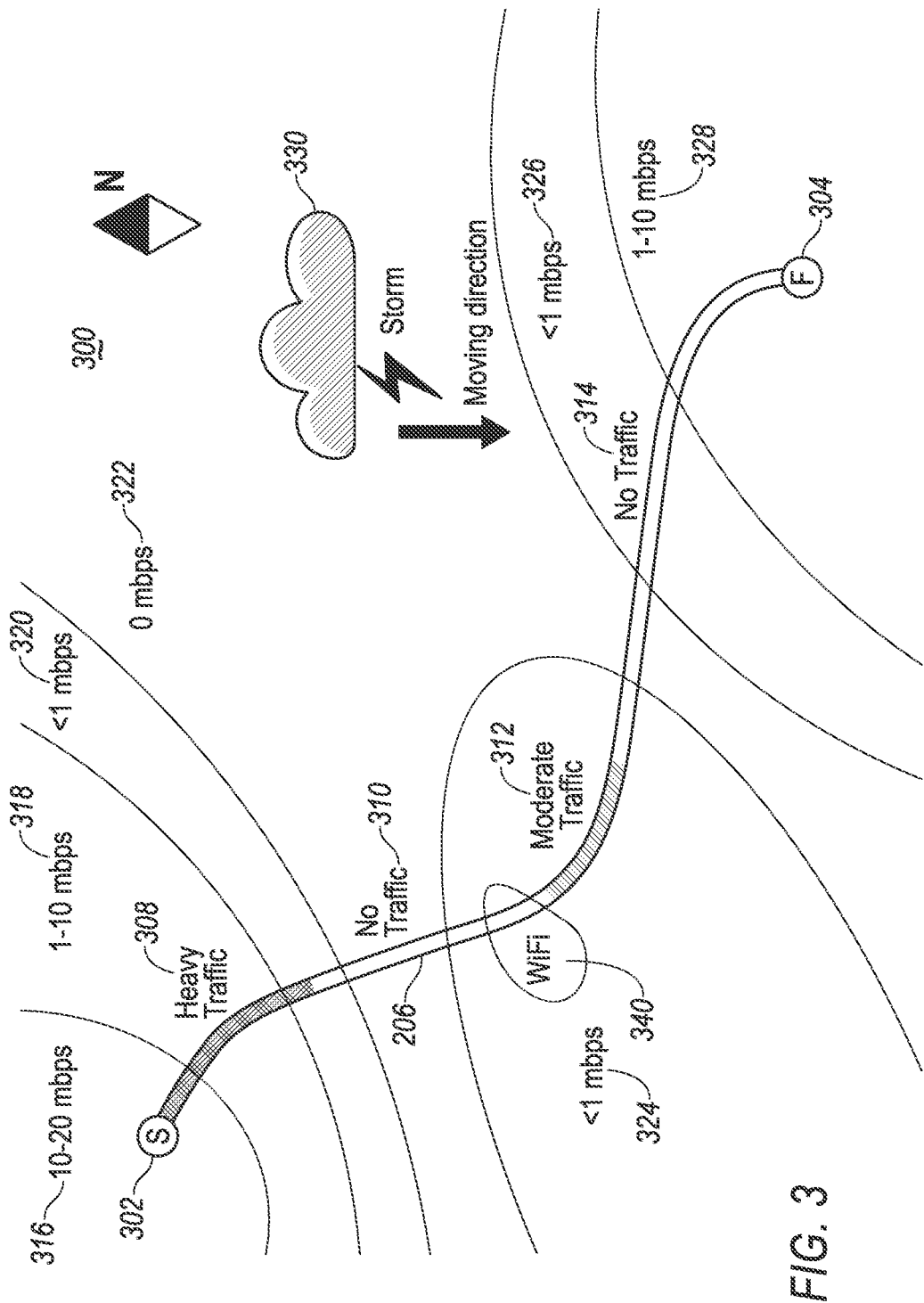
FIG. 3 illustrates an example map diagram of a planned route of one embodiment of the present disclosure.

Referring to FIG. 3, an example map diagram 300 of one embodiment of the present disclosure is illustrated. With continuing reference to FIGS. 1 and 2, a route 206 from a starting location 302 to a finishing location 304 for the vehicle 102 may be planned by the computing platform 104 or the mobile device 140 of the vehicle 102. Alternatively, if no planned route is received, the server 182 may predict the route 206 through machine learning algorithms using the historical driving pattern of the vehicle 102.

Responsive to receiving or generating the route 206, the server 182 may be configured to collect and evaluate various factors to optimize the update. The server 182 may receive traffic condition 208 and driving condition data 212 on the route 206 from other sources 184. As illustrated in FIG. 3, the route 206 may be divided into multiple sections with different traffic condition. At the beginning of the route 206, the vehicle 102 may encounter a heavy traffic section 308 near the starting location 302, which is followed by section 310 with no traffic. At around the middle of the route 206, there is a moderate traffic section 312. As an example, the moderate traffic may be caused by road work within section 312 which is reflected by the driving condition 212. In section 314, there will be no traffic until the finishing location 304. With the information about the distance of the route 206, traffic condition 208 and driving condition 212, the server 182 may be able to calculate the estimated time of arrival, as well as estimated time that the vehicle 102 is to arrive and spend within each section along route 206.

Next, the server 182 may be configured to collect network connectivity data 202 near the route 206 from other sources 184. In the example illustrated in FIG. 3, the route 206 spans across multiple network coverage areas with different speed. In area 316 near the starting location 302, the cellular network speed is fast at 10-20 megabits per second (Mbps) for the wireless carrier that the vehicle 102 or the mobile device 140 is subscribed to. As the route 206 is traversed, the vehicle 102 later enters area 318 where the cellular network speed reduces to 1-10 Mbps. When the vehicle 102 reaches area 320 along the route 206, the cellular network speed drops to <1 Mbps. In area 322, no cellular coverage is available. However, when the vehicle 102 reaches area 324 which is surrounded by area 322 near the middle of the route 206, a slow cellular network coverage of <1 Mbps is available. As the vehicle 102 moves closer to the finishing location 304 and enters area 314, a slow cellular network coverage of <1 Mbps is available, until the vehicle 102 reaches area 328, where the cellular speed increases to 1-10 Mbps. It is noted that, as an example, a public WiFi service is available in area 340 which is inside area 324 and overlaps the route 206. The speed of the public WiFi may be faster at around 30-50 Mbps as an example.

The server 182 may be configured to further collect weather condition data 210 near the route 206 from other sources 184. As an example, a storm 330 has formed on the North and is moving South toward the route 206 near the finishing location 304. When the storm reaches areas 326 and 328, it may affect the cellular signal strength as well as the connection speed. Since the estimated time of arrival at each section or location can be determined as discussed above, the server 182 may be configured to take the weather factor into account to estimate whether it will affect the download of the update, so as to better optimize the update for the vehicle 102.

As illustrated in FIG. 3, area 316 overlaps with section 308 on the route 206 with heavy traffic, which suggests potential reduced speed on both the road and the connection. Using the estimated downloading speed and travel time, the server 182 may estimate the data download capacity in area 318 for the vehicle 102. Using the same method, the server 182 may estimate the download capacity in other areas along the route 206. When multiple software update files are available, different criticalities and file sizes may apply to each file as designated by the manufacturer. Using the estimated time 204 to perform the update, the available connectivity 202 along the route 206 and the business rules 214, the server 182 may be configured to determine the optimal priority/order for the vehicle 102 to download multiple update files.

Figure 4:
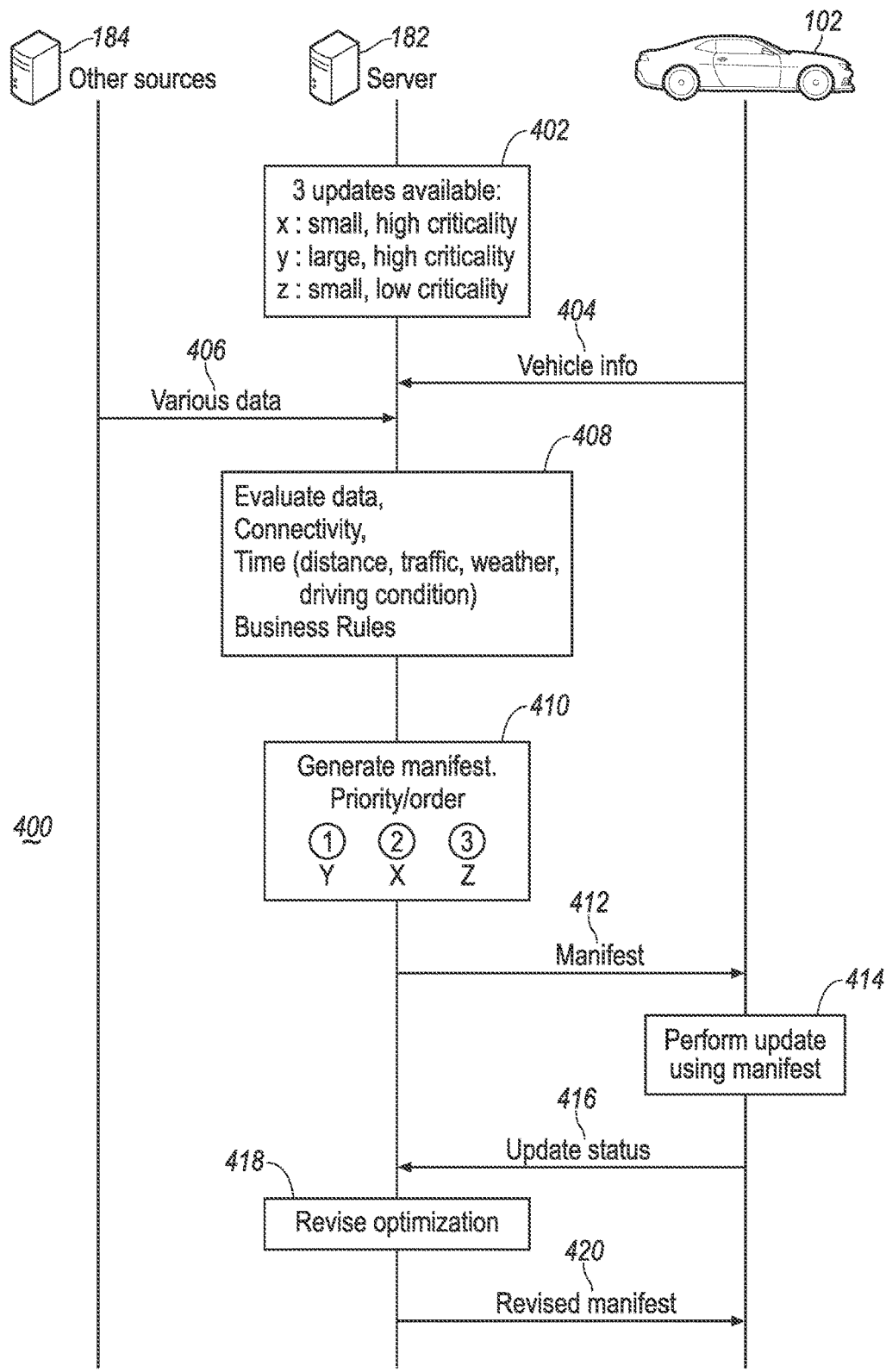
FIG. 4 illustrates an example data flow diagram of one embodiment of the present disclosure.

Referring to FIG. 4, an example data flow diagram 400 of one embodiment of the present disclosure is illustrated. With continuing reference to FIGS. 1-3, at operation 402, three updates are made available at the server 182. The three updates are X: with small file size and high criticality; Y: with large file size and high criticality; and Z: with small file size and low criticality. It is noted that these updates are merely examples for illustrative purposes and more or fewer updates having different business rules 214 may be made available at the same or different times.

At operation 404 the server 182 receives vehicle information 218 from the vehicle 102. For instance, the vehicle information may include VIN, vehicle software/application versions, vehicle location, planned routes, and vehicle connectivity status. As discussed above, the server 182 may be configured to predict a route for the vehicle 102 using the historical driving pattern data previously collected from the vehicle 102 if no planned route is received.

At operation 406, the server 182 collects various data from other sources 184. For instance, various data may include available connectivity 202, traffic condition 208, weather condition 210, driving condition 212 along the planned or predicted route 206.

Having received vehicle information 404 from the vehicle 102 and various data 406 from other sources 184, at operation 408, the server 182 evaluates the data 406 and vehicle information 404 so as to optimize the OTA software update. Taking the above three updates for instance, since both updates X and Y have high criticality, they will be prioritized over Z which has low criticality. The server 182 then may be configured to determine which one to download first among X and Y. With continuing reference to the example illustrated in FIG. 3, the server 182 may determine along the route 206, within areas 316, 318, 320, 324 and 340, there is enough network connection speed and time to download the both updates X and Y. In this case, the server 182 may determine to prioritize update Y over X because larger files should be downloaded first, if possible. It is noted that, the method to prioritize download files discussed here is merely an example. Other method and logic may be used to evaluate the data and prioritize download.

At operation 410, the server 182 generates the manifest 216 indicative of the optimized download priority for the vehicle 102. Following the example discussed above, the priority is to download Y first, X second, and Z last.

At operation 412, the server 182 sends the manifest 216 to the vehicle 102 via the wireless connection 192 through the TCU 164, or via the wireless connection 194 using the mobile device 140.

At operation 414, responsive to receiving the manifest 216 sent from the server 182, the vehicle 102 performs the update in the priority indicated by the manifest 216.

At operation 416, the vehicle 102 sends the update status to the server 182 allowing the server 182 to monitor the status of the update. Depending on the status of OTA update as well as change of circumstances (e.g. change of traffic condition with new estimated arrival time), at operation 418, the server 182 may dynamically revise the optimization previously processed and generate a revised manifest. At operation 420, the server 182 sends the revised manifest to the vehicle 102 to perform the revised optimized update.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle, comprising:
   a processor, programmed to
     responsive to receiving a manifest indicative of a download priority from a server, perform an over-the-air (OTA) software update while traveling along a route, wherein the manifest is generated remotely by the server using business rules designated by a manufacturer, predicted network connectivity speeds along the route, and estimated time to download the OTA software update;

send an update status to the server indicating one or more of a change in the route or a change in traffic conditions along the route; and receive a revised manifest indicative of a revised order to perform the OTA update.

2. The system of claim 1, wherein the estimated time is calculated using at least one of predicted travel distance along the route; traffic condition along the route; weather conditions along the route; and driving conditions along the route.

3. The system of claim 2, wherein the driving condition includes at least one of a speed limit, an indication of road work, or municipality connectivity policies.

4. The system of claim 1, wherein the processor is further programmed to upload the route and location of the vehicle to the server.

5. The system of claim 1, wherein the predicted network connectivity speed is determined using at least one of: availability of WiFi along the route, cellular network coverage or speed along the route, or information indicative of vehicle-to-everything (V2X) connections along the route.

6. The system of claim 1, wherein the estimated time is calculated using a historical traveling pattern of the vehicle generated by the server using historical location and route data of the vehicle.

7. The system of claim 1, wherein the business rules include at least one of: update criticality, file size of an update, target module of an update, or marketing campaign corresponding to an update.

8. A server, comprising:
a processor, programmed to
responsive to receiving over-the-air (OTA) software update for a vehicle, optimize an operation to perform OTA software updates on the vehicle, using estimated time to download the updates, predicted network connectivity speed for the vehicle by location, and business rules designated by a manufacturer, to generate a manifest indicative of an optimal order to download the OTA software updates; and
send the manifest to the vehicle;
receive an update status including one or more of a change in route or a change of traffic conditions from the vehicle;
generate a revised manifest indicative of a revised order to download the OTA software update using the update status; and
send the revised manifest to the vehicle.

9. The server of claim 8, wherein the processor is further programmed to calculate the estimated time using at least one of predicted travel distance along a route, traffic condition along the route, weather condition along the route, or driving condition along the route.

10. The server of claim 9, wherein the processor is further programmed to receive the route and location from the vehicle.

11. The server of claim 9, wherein the driving condition includes at least one of speed limit, road work, or municipality connectivity policies along the route.

12. The server of claim 8, wherein the processor is further programmed to determine the predicted network connectivity speed using at least one of: availability of WiFi along the route, cellular network coverage or speed along the route, or information indicative of vehicle-to-everything (V2X) connections along the route.

13. The server of claim 8, wherein the processor is further programmed to calculate the estimated time using a historical traveling pattern of the vehicle generated by the server using historical location and route data of the vehicle.

14. The server of claim 8, wherein the business rules further include additional factors to consider in determining the optimal order, the factors including: criticality of an update; file size of an update; target module of an update; or marketing campaign corresponding to an update.

15. A method for optimizing download priority for multiple updates of a vehicle, comprising:
receiving a route planned for the vehicle;
receiving traffic data along the route, predicted connectivity speed data along the route, and driving condition data along the route from a source external to the vehicle;
evaluating the predicted connectivity speed data, traffic data, driving condition data, and business rule of the multiple updates;
generating a manifest indicative of the download priority;
sending the manifest to the vehicle;
receiving an update status including one or more of a change in route or a change of traffic conditions from the vehicle;
generating a revised manifest indicative of a revised order to download an OTA software update using the update status; and
sending the revised manifest to the vehicle.

* * * * *